United States Patent
Goff et al.

(10) Patent No.: US 11,092,199 B2
(45) Date of Patent: Aug. 17, 2021

(54) DOWN-HOLE MOTOR UNIVERSAL JOINT ASSEMBLY

(71) Applicant: Hawg Tools LLC, Brighton, CO (US)

(72) Inventors: Gregory Clarence Goff, Bar Nunn, WY (US); Patrick Daniel Gallagher, Mills, WY (US); Daniel Robert Gallagher, Casper, WY (US)

(73) Assignee: New Ventures Marketing, LLC, Brighton, CO (US)

(*) Notice: Subject to any disclaimer, the term of this patent is extended or adjusted under 35 U.S.C. 154(b) by 372 days.

(21) Appl. No.: 16/166,819

(22) Filed: Oct. 22, 2018

(65) Prior Publication Data

US 2020/0124109 A1    Apr. 23, 2020

(51) Int. Cl.
| | |
|---|---|
| *F16D 3/221* | (2006.01) |
| *E21B 4/02* | (2006.01) |
| *F16D 3/2237* | (2011.01) |
| *F16D 3/18* | (2006.01) |
| *F16D 3/223* | (2011.01) |

(52) U.S. Cl.
CPC .............. *F16D 3/221* (2013.01); *E21B 4/02* (2013.01); *F16D 3/185* (2013.01); *F16D 3/2237* (2013.01); F16D 2003/22313 (2013.01); F16D 2300/06 (2013.01)

(58) Field of Classification Search
CPC ........ F16D 3/221; F16D 3/185; F16D 3/2237; F16D 2300/06; F16D 2003/22313; F16D 3/18; E21B 4/02
USPC ......................................... 464/154, 156, 158
See application file for complete search history.

(56) References Cited

U.S. PATENT DOCUMENTS

| 2,744,449 A | * | 5/1956 | Belden ................... B23F 15/00 |
| | | | 464/158 |
| 5,267,905 A | | 12/1993 | Wenzel et al. |
| 5,704,838 A | | 1/1998 | Teale |

* cited by examiner

*Primary Examiner* — Greg Binda
(74) *Attorney, Agent, or Firm* — James A. Sheridan; Sheridan Law, LLC

(57) ABSTRACT

A universal joint (U-joint) assembly transmits torque from a drive component to a driven component across an articulating joint. The U-joint assembly includes male and female U-joint members, a central ball joint, and a retaining device configured to secure the assembly in an assembled configuration. The female U-joint member includes a cavity extending into a receptacle end thereof. The cavity terminates in a circular receptacle and includes four flat surfaces extending longitudinally therefrom at 90-degree intervals. The male U-joint member has a drive end with four multi-angled surfaces extending longitudinally from the drive end at 90-degree intervals about a periphery of the drive end. When in an assembled configuration, each of the multi-angled surfaces of the drive end of the male U-joint member opposes a corresponding one of the four flat surfaces of cavity of the female U-joint member. Other embodiments are also disclosed.

9 Claims, 19 Drawing Sheets

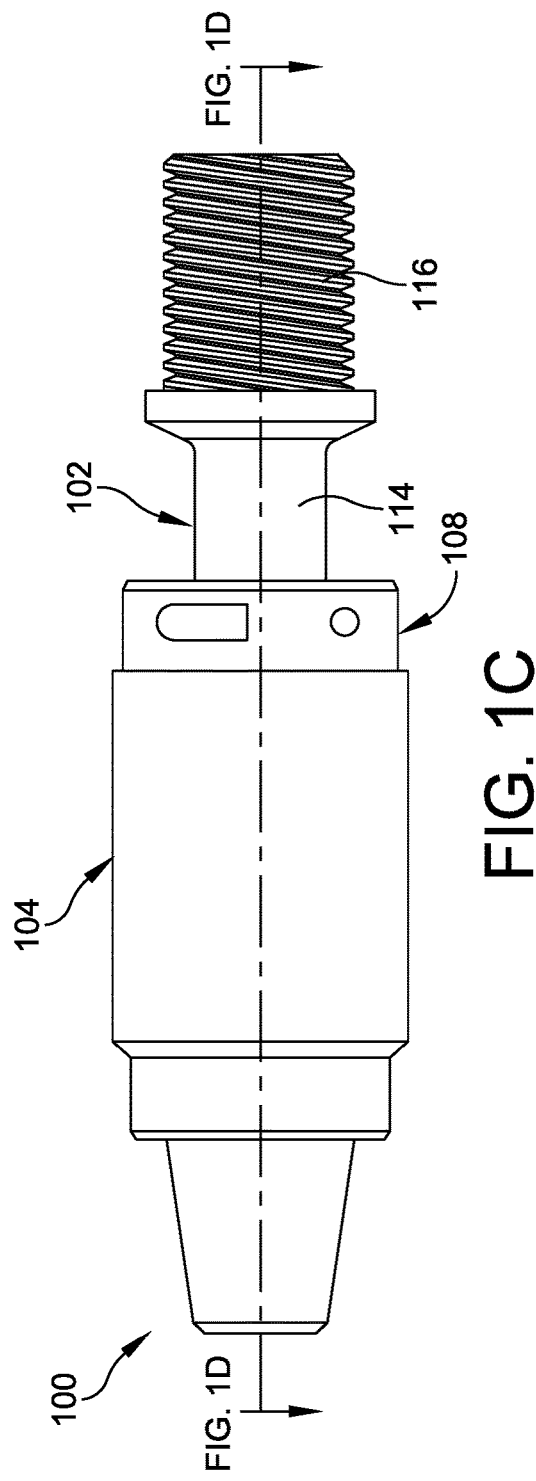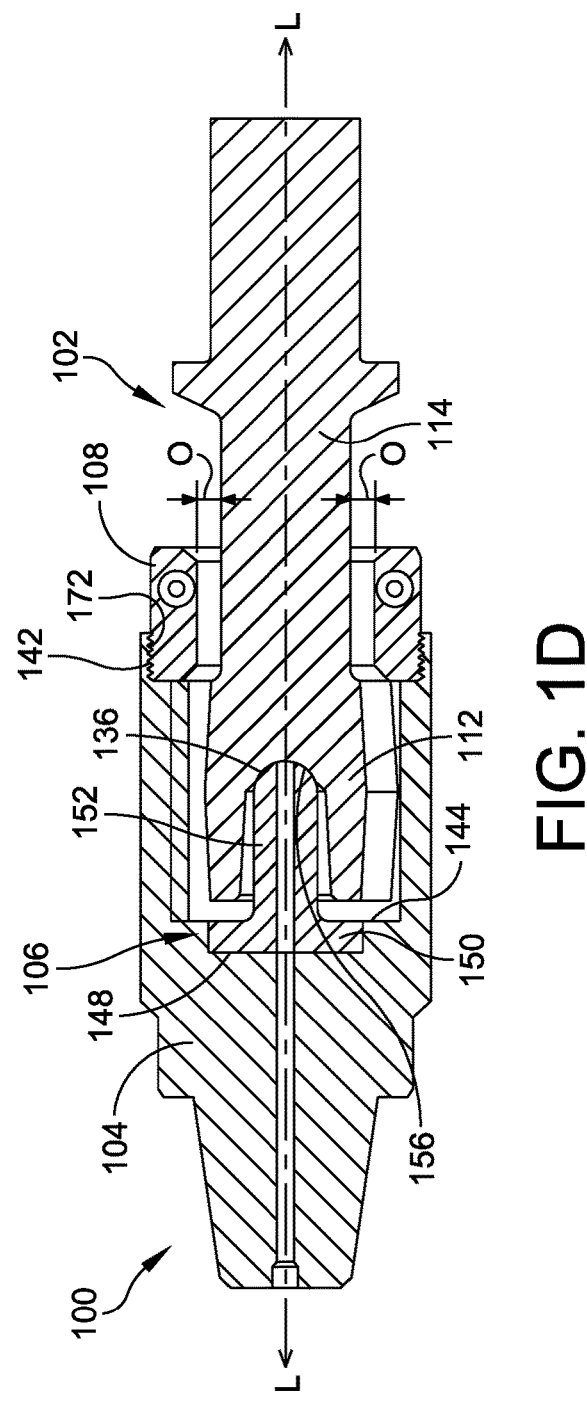

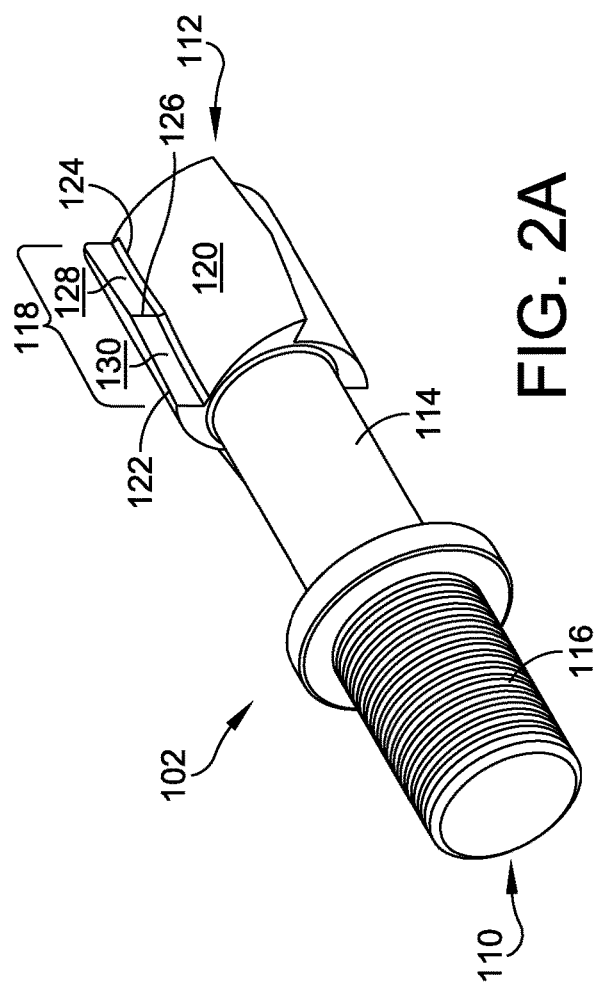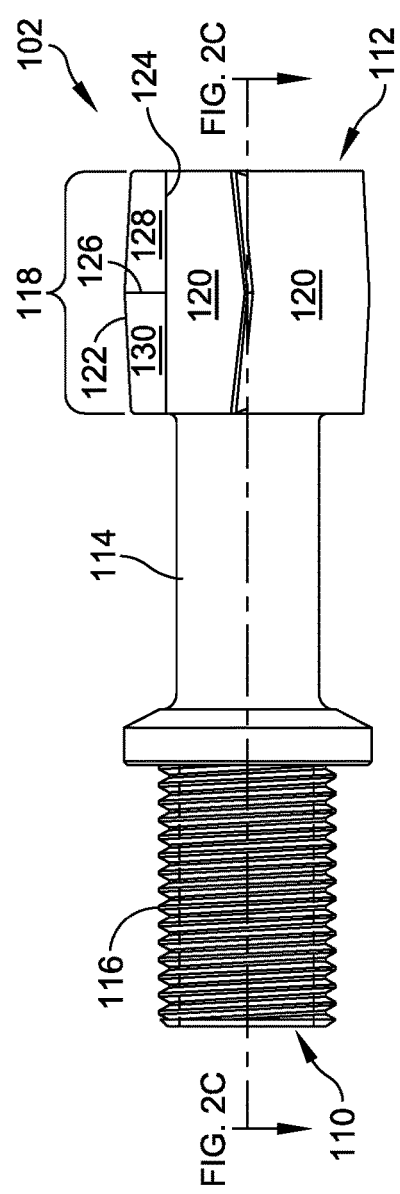

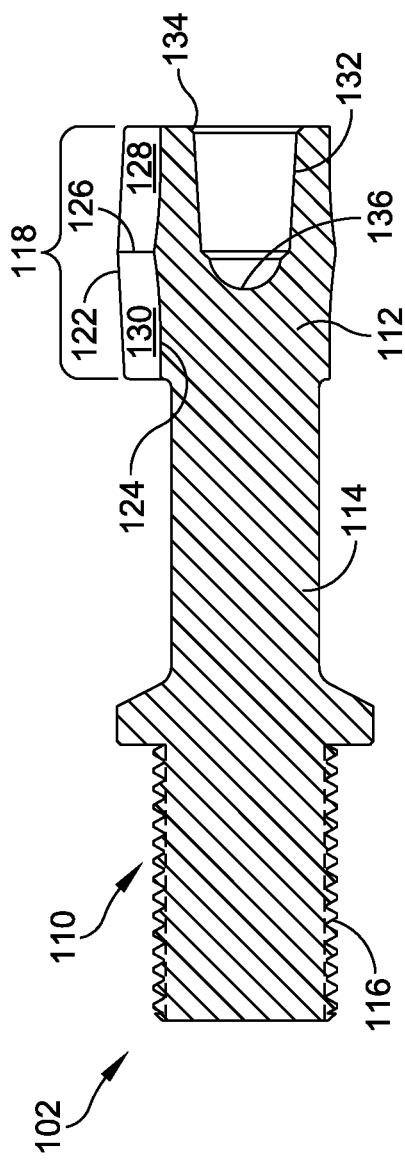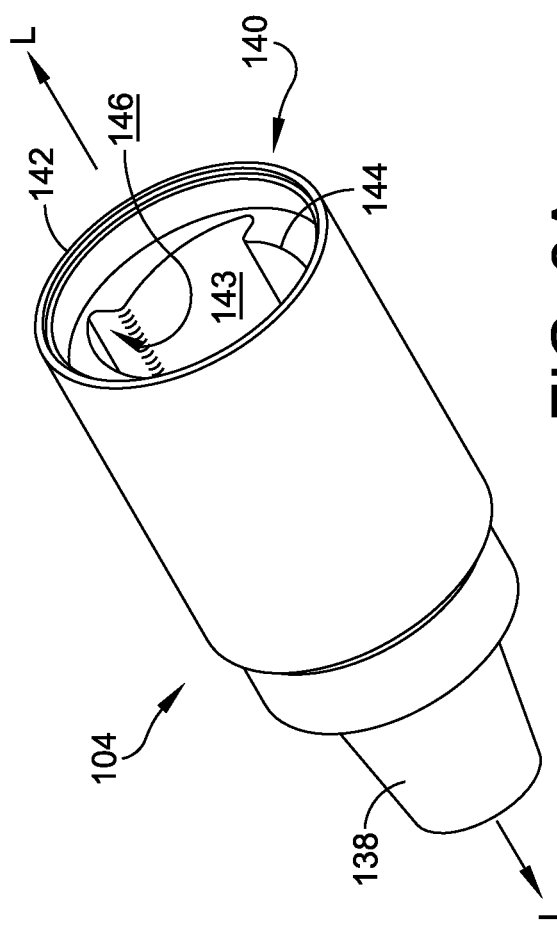

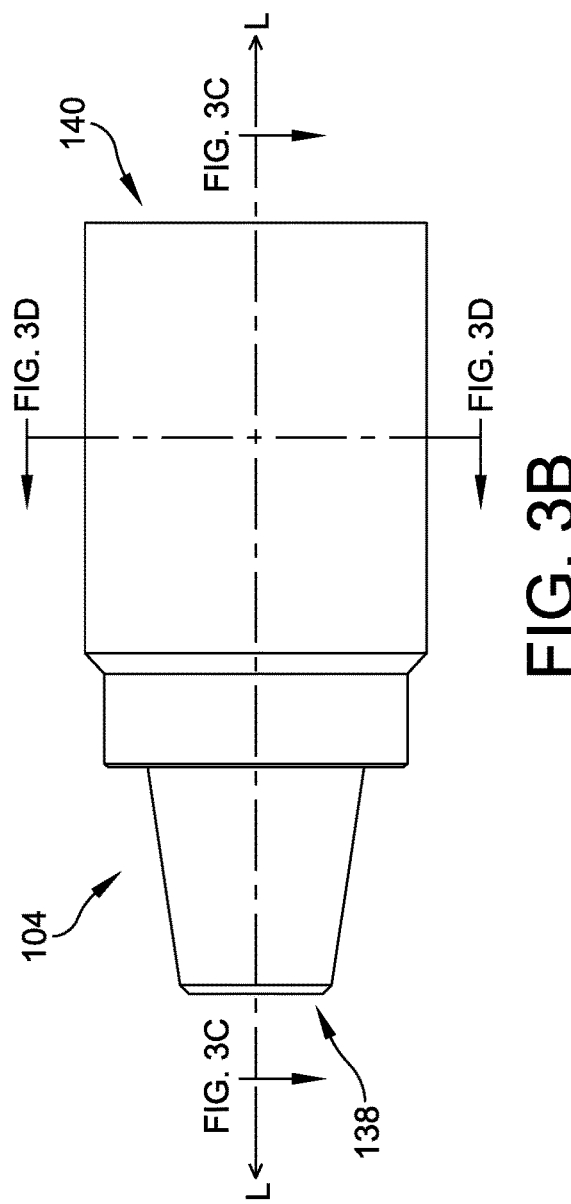
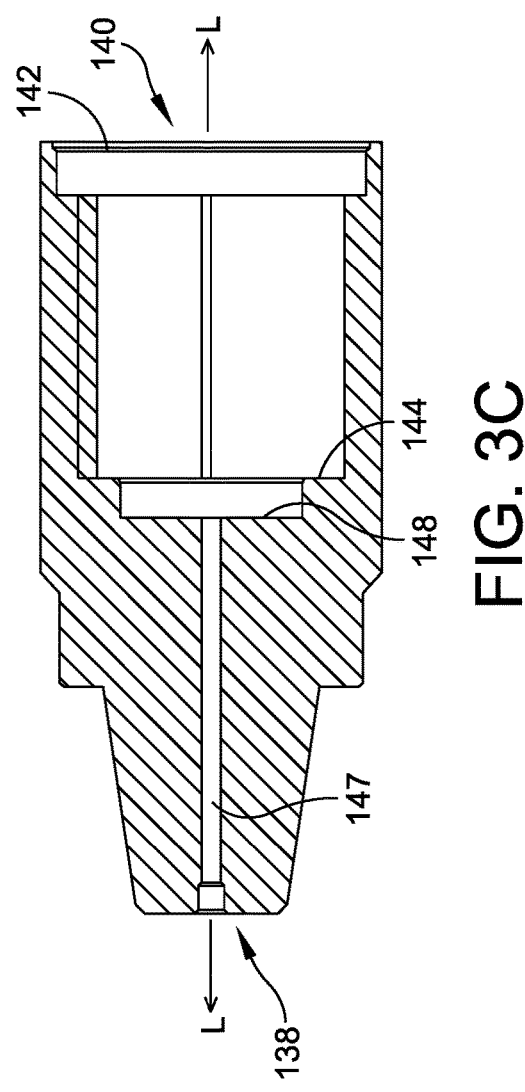

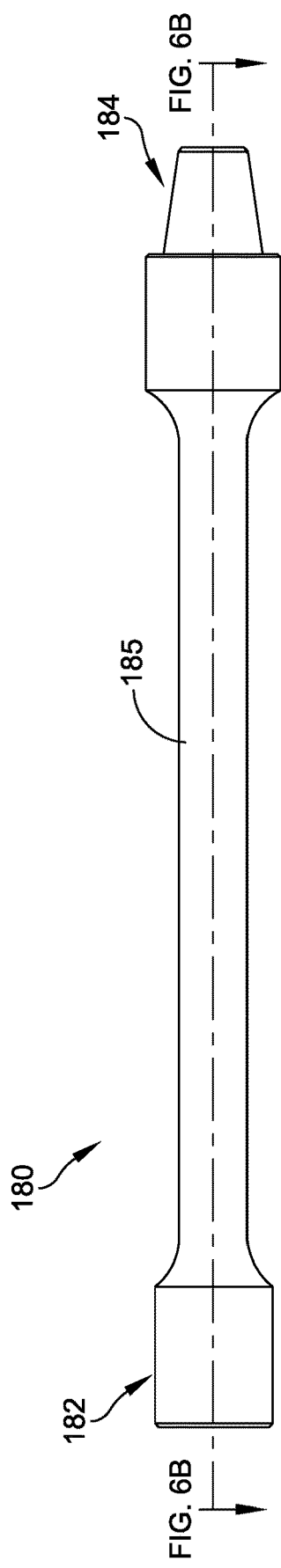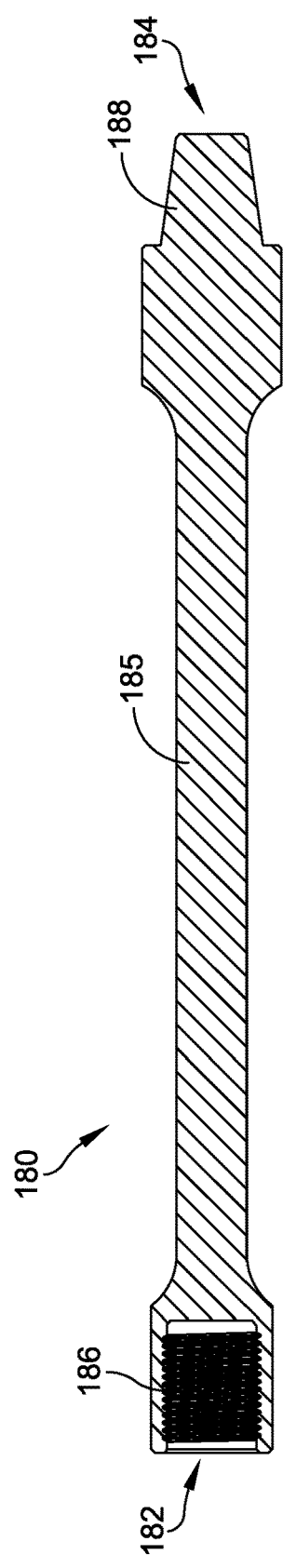

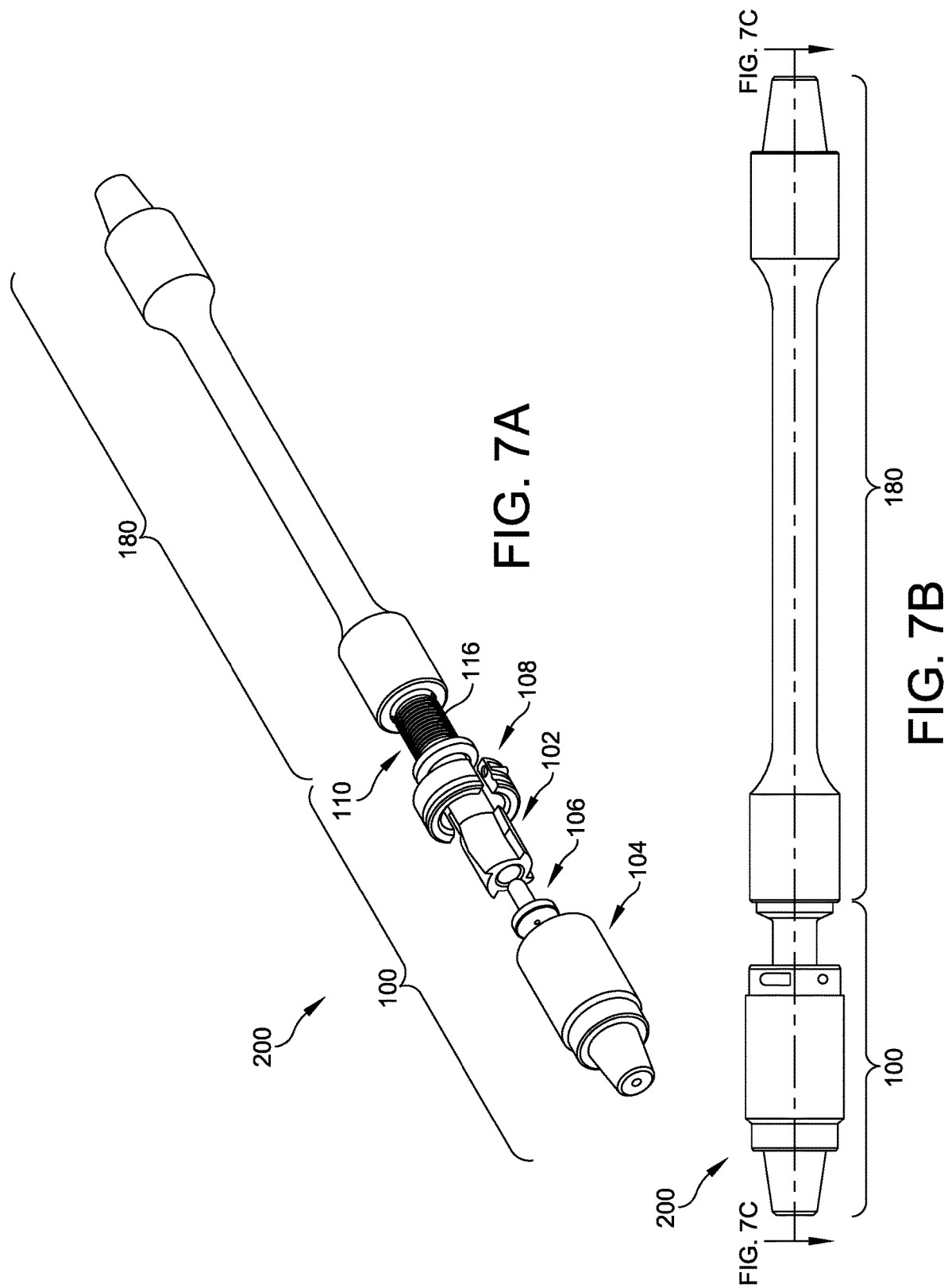

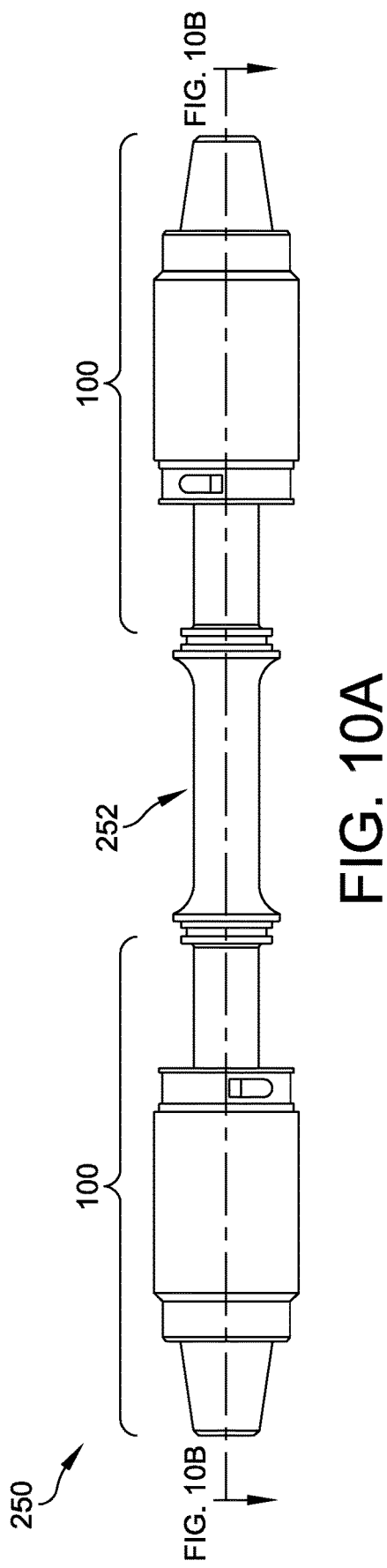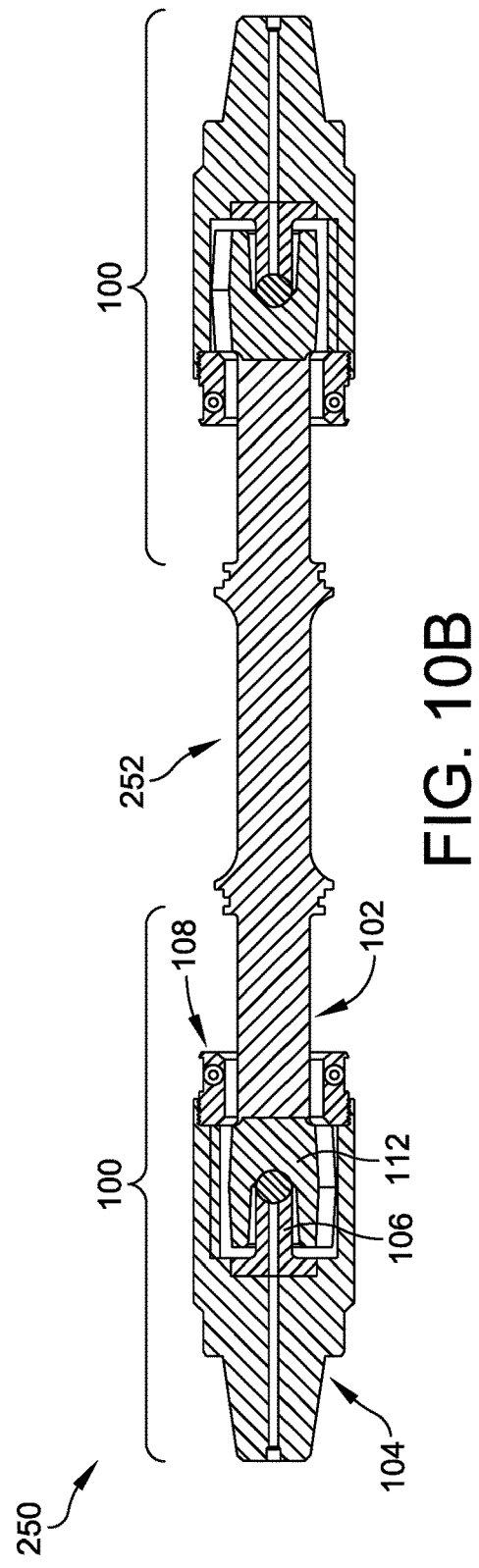

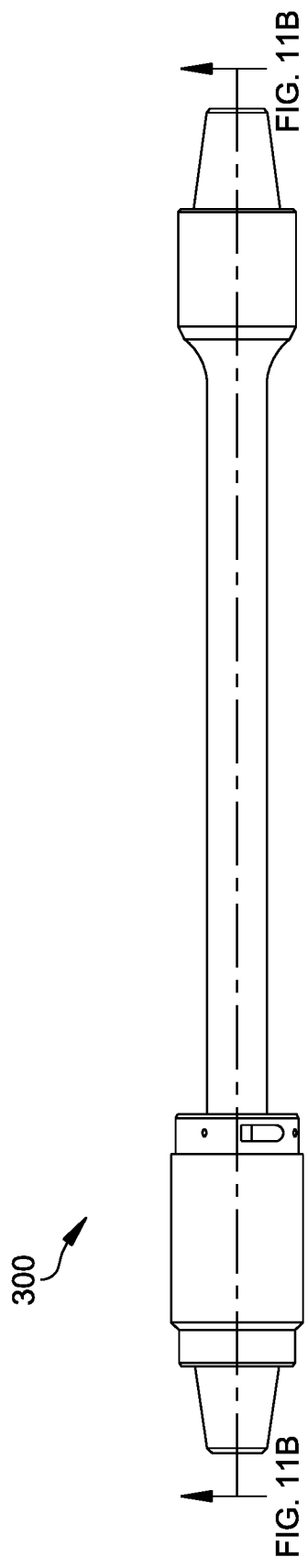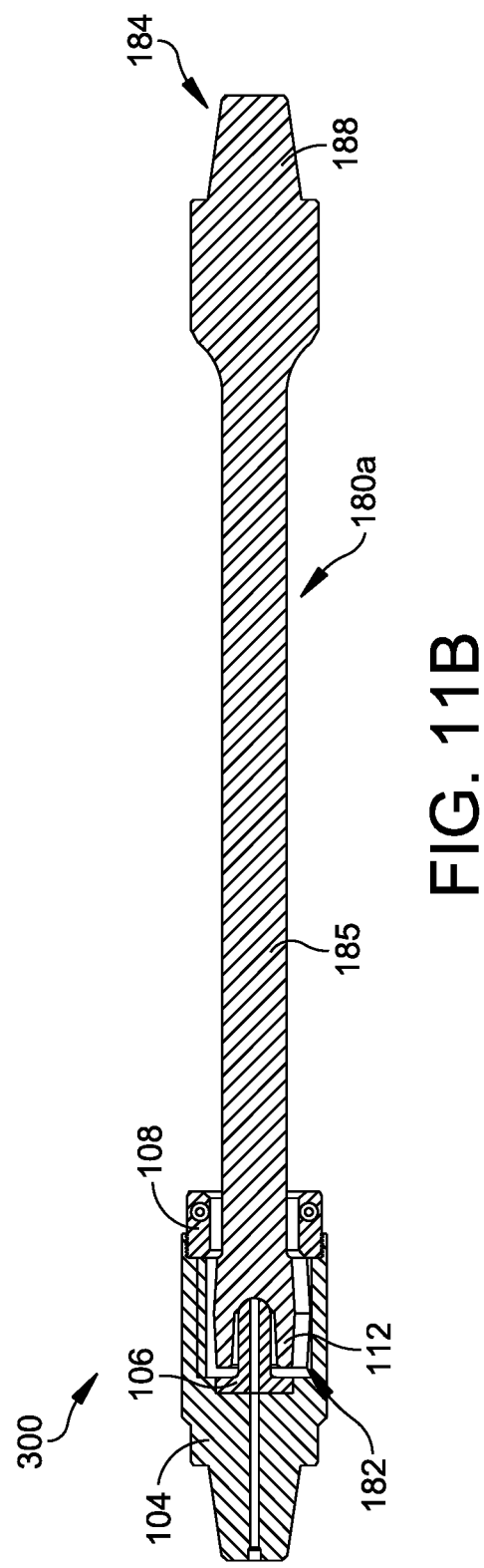

350

```
┌─────────────────────────────────────┐
│  Operably couple a single universal │
│  joint (U-joint) assembly between   │
│  a drive component (e.g., a mud     │
│  motor rotor) and a driven          │
│  component (e.g., a mud motor       │
│  output shaft)                      │
│  352                                │
└─────────────────────────────────────┘
                  ↓
┌─────────────────────────────────────┐
│  Position the universal joint       │
│  (U-joint) assembly at an angled    │
│  or articulating joint (e.g., a     │
│  bend in a mud motor housing)       │
│  354                                │
└─────────────────────────────────────┘
                  ↓
┌─────────────────────────────────────┐
│  Articulate the male U-joint member │
│  relative the longitudinal axis, L, │
│  defined by the female U-joint      │
│  member such that the male U-joint  │
│  member is disposed at an angle     │
│  relative to the longitudinal axis  │
│  356                                │
└─────────────────────────────────────┘
                  ↓
┌─────────────────────────────────────┐
│  Actuate the drive component such   │
│  that a torque is transmitted from  │
│  the male U-joint member to the     │
│  female U-joint member through a    │
│  contact between select ones of     │
│  the four multi-angled surfaces     │
│  positioned parallel to the angle   │
│  of the male U-joint member and     │
│  adjacent ones of the flat surfaces │
│  of the cavity of the female        │
│  U-joint member                     │
│  358                                │
└─────────────────────────────────────┘
```

FIG. 13

DOWN-HOLE MOTOR UNIVERSAL JOINT ASSEMBLY

BACKGROUND

Down-hole mud motors are used to apply torque to a drill bit in oil and gas wells and other drilling applications. The mud motor is placed at a distal end of the drill string, with a drill bit connected to a distal end of an output shaft. Drilling fluid or "mud" pumped through the drill string flows through the mud motor, and the motor uses the force of the fluid to produce a mechanical output to rotate the output shaft and the drill bit.

Although there are different types of mud motors, the most commonly used type today is a positive-displacement motor which uses an elongated, helically-shaped rotor within a corresponding helically-shaped stator. The flow of drilling fluid or mud between the stator and the rotor causes the rotor to orbit within the stator eccentrically about a longitudinal axis of the stator. The rotor itself rotates about its own longitudinal axis and also orbits eccentrically around the central longitudinal axis of the stator. This eccentric orbit and rotation of the rotor must be transferred by a suitable transmission assembly to produce a concentric rotation for the output shaft.

Universal joint assemblies, commonly referred to as U-joints, are required in order to transfer the eccentric orbit and rotation of the rotor to the concentric rotation of the output shaft to drive the drill bit. To currently accomplish this, an output end of the rotor is connected to a first U-joint, and a shaft connects the first U-joint to a second U-joint. The second U-joint is, in turn, connected to a concentrically rotating output shaft.

In addition to transferring the eccentric rotation of the rotor to a concentrically rotating shaft, down-hole mud motors may require other U-joints. For example, a mud motor may be designed with a bent housing for use in directional drilling. Mud motors may also include a mechanism by which the housing may be bent at a suitable angle for a particular directional drilling effect. In either case, a U-joint may be required to traverse the bend in the housing.

Regardless of how a U-joint is used in a down-hole mud motor, such U-joints are subjected to very high torques and operate in a very hostile environment.

U.S. Pat. No. 5,267,905 to Wenzel et al. discloses one example of a prior art U-joint assembly for a down-hole mud motor. The Wenzel device and other existing U-joints include articulating joint members with a series of peripherally spaced balls transmitting torque from one U-joint member to the other. The torque transmitting balls provide a positive coupling between the two joint members. However, the balls are each held within a dimple formed in one of the joint members and, therefore, must rotate with respect to the dimple surface as the joint articulates. This rubbing action between the torque transmitting ball and the dimple in which it is held can cause excessive wear to the ball and the dimple, eventually damaging the joint.

Another problem with prior art mud-motor U-joints involves the seal structure that protects the bearing surfaces within the joint. Seals for U-joints used in mud motor applications must allow smooth articulation as the joint rotates, while protecting the internal bearing surfaces of the joint from extreme pressure, pressure variations, and high velocity drilling fluid. Should these seals fail, the joint is exposed to the hostile environment of the drilling fluid, and rapid wear and failure may occur.

Yet another problem with current drive shaft assemblies is the requisite use of two U-joint assemblies to accommodate an articulating joint, one on each end of a common shaft, which increases the chance of component failure.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides a universal joint (U-joint) assembly for transmitting torque from a drive component to a driven component across an articulating joint. The U-joint assembly may include a female U-joint member coupled with the driven component, the female U-joint member defining a longitudinal axis and including a receptacle end, the receptacle end comprising: (1) a cavity extending into the receptacle end and terminating in a circular receptacle; and (2) four flat surfaces extending longitudinally from the cavity at 90-degree intervals about an inner diameter of the cavity. The U-joint assembly may also include a male U-joint member coupled with the drive component and having a drive end, the drive end comprising four multi-angled surfaces extending longitudinally from the drive end at 90-degree intervals about a periphery of the drive end. When the drive end of the male U-joint member is received coaxially within the cavity of the female U-joint member, each of the multi-angled surfaces of the drive end of the male U-joint member opposes a corresponding one of the four flat surfaces of the female U-joint member.

Another embodiment provides a transmission assembly for transmitting torque across an angular connection between a torsional drive component and a torsionally driven component. The transmission assembly may include (1) a flexible shaft operably coupled with the torsional drive component; and (2) a single universal joint (U-joint) assembly operably coupled between the flexible shaft and the driven component, the single U-joint assembly comprising a female U-joint member defining a longitudinal axis, a central ball seat seated within the female U-joint member, and a male U-joint member axially mounted about the central ball seat and within the female U-joint member.

Yet another embodiment provides a method of transmitting a torque from a drive component to a driven component across an angled joint. The method may include the step of positioning a universal joint (U-joint) assembly at the angled joint, the U-joint assembly comprising: (1) a female U-joint member coupled with the driven component, the female U-joint member defining a longitudinal axis and including a receptacle end, the receptacle end comprising a cavity extending into the receptacle end, the cavity terminating in a circular receptacle and including four flat surfaces extending longitudinally from the cavity at 90-degree intervals about an inner diameter of the cavity; and (2) a male U-joint member coupled with the drive component and having a drive end comprising four multi-angled surfaces extending longitudinally from the drive end at 90-degree intervals about a periphery of the drive end, the drive end received coaxially within the cavity of the female U-joint member such that each of the multi-angled surfaces of the drive end of the male U-joint member opposes a corresponding one of the four flat surfaces of the cavity of the female U-joint member. The method may further include the steps of articulating the male U-joint member about the longitudinal axis such that the male U-joint member is disposed at an angle relative to the longitudinal axis that is equal to an angle of the angled joint, and actuating the drive component such that the torque is transmitted from the male U-joint member to the female U-joint member through a contact area between select ones of the four multi-angled surfaces that are positioned parallel to the angle of the male U-joint member and opposing ones of the flat surfaces of the female U-joint member.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIGS. 1A-1D illustrate respective side-exploded, perspective-exploded, side-plan, and cross-sectional views of one embodiment of a universal joint (U-joint) assembly for transmitting torque across an articulating joint;

FIGS. 2A-2C illustrate respective perspective, side-plan, and cross-sectional views of one embodiment of a male U-joint member of the U-joint assembly of FIGS. 1A-1D;

FIGS. 3A-3D illustrate respective perspective, side-plan, and cross-sectional views of one embodiment of a female U-joint member of the U-joint assembly of FIGS. 1A-1D;

FIGS. 6A-6B illustrate respective side-plan and cross-sectional views of one embodiment of a flexible shaft for operable connection to the U-joint assembly of FIGS. 1A-1D;

FIGS. 7A-7C illustrate respective exploded-perspective, side-plan, and cross-sectional views of one embodiment of a drive assembly incorporating the U-joint assembly of FIGS. 1A-1D coupled with the flexible shaft of FIGS. 6A-6B;

FIGS. 10A-10B illustrate respective side-plan and cross-sectional views of one embodiment of an alternative drive assembly including two U-joint assemblies shown in FIGS. 1A-1D connected by a common cylindrical shaft;

FIGS. 11A-11B illustrate respective side-plan and cross-sectional views of another alternative embodiment of a drive assembly featuring the female U-joint member of FIGS. 3A-3D, the central ball seat of FIGS. 4A-4D, the retaining device of FIGS. 5A-5C, and a flexible shaft that incorporates an embodiment of a drive head of the male U-joint member of FIGS. 2A-2C;

FIG. 13 provides a flowchart depicting an exemplary method of using an embodiment of one of the drive assemblies of FIGS. 7A-7C, 10A-10C, and 11A-11B to transmit torque across an articulating or angled joint.

DETAILED DESCRIPTION

Figure 1A:
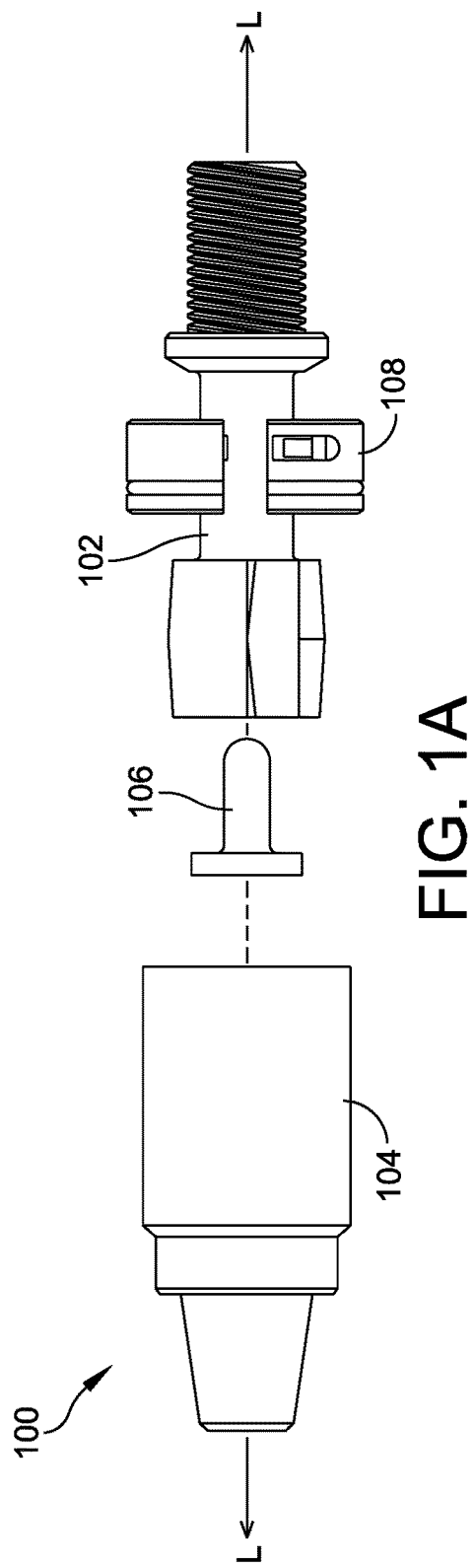
Figure 1B:
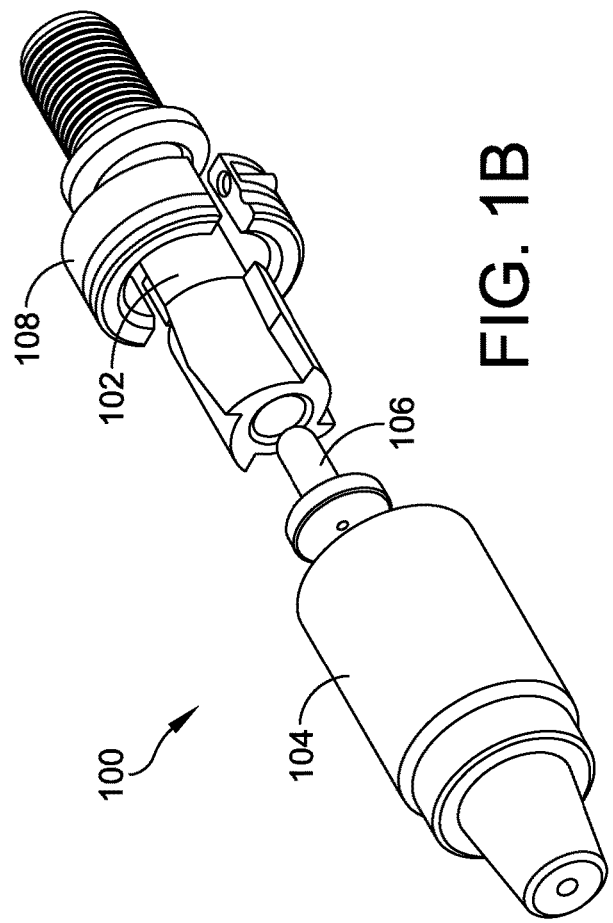
Figure 3D:
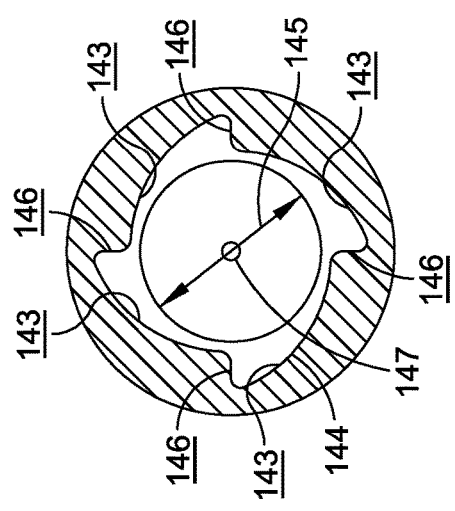
Figure 4A:
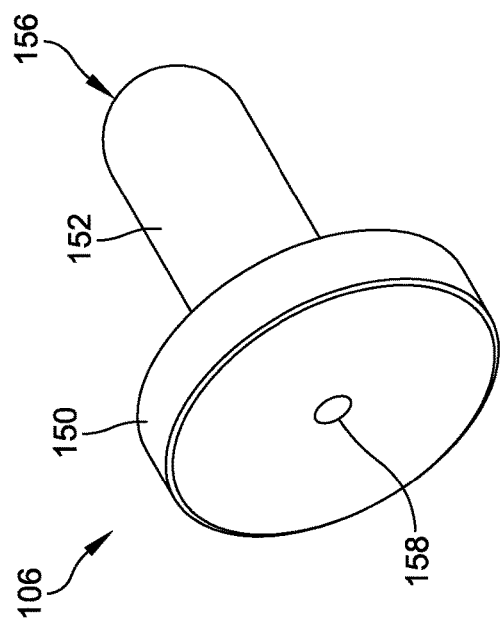
FIGS. 4A-4D illustrate respective perspective, top-plan, side-plan, and cross-sectional views of one embodiment of a central ball seat of the U-joint assembly of FIGS. 1A-1D.
Figure 4B:
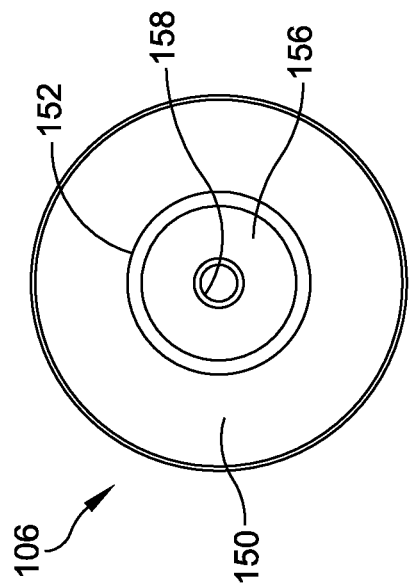
Figure 4C:
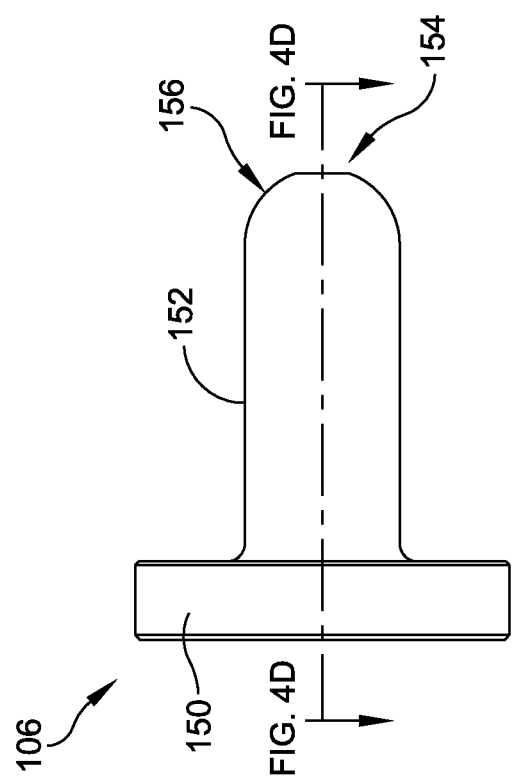

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Various embodiments of the systems and methods described herein relate to universal joint assemblies, or U-joint assemblies, for transferring torque in a variety of drilling environments involving a down-hole mud motor including, for example, transferring torque between an eccentrically rotating rotor and a concentrically rotating output shaft of a mud motor to drive a drill bit or in traversing a bend in a housing of a mud motor. More specifically, this description discusses embodiments of a U-joint assembly that transmits torque across the articulating joint assembly, or between U-joint members, by maintaining a near constant face-to-face contact between a male U-joint member and a female U-joint member as the joint articulates.

Embodiments of the disclosed U-joint assembly and associated drive assemblies may be operated in any drilling environment with minimal wear or damage to the components due to a minimal number of components required to form the assemblies, the primary material used to manufacture the assembly components, and the ability for the U-joint assembly and drive assemblies to be operated in either a sealed and lubricated environment or, should a loss of sealing and lubrication occur, operated with only drilling fluid as a lubricating fluid.

Turning to the exemplary embodiments, FIGS. 1A-1D illustrate respective perspective-exploded, side-exploded, side-plan, and cross-sectional views of one embodiment of a U-joint assembly 100 for transmitting torque across an angled or articulating joint. In this embodiment, the U-joint assembly 100 may include a female U-joint member 104 defining a longitudinal axis L, as well as a male U-joint member 102, a central ball seat 106, and a retaining device 108, all coaxially mounted along the longitudinal axis, L.

FIGS. 2A-2C illustrate respective perspective, side-plan, and cross-sectional views of one embodiment of the male U-joint member 102. In this embodiment, the male U-joint member 102 may include a male-threaded end 110 separated from an opposing drive end 112 by a smaller diameter shaft 114 extending therebetween. The male-threaded end 110 may form a male threaded connection 116 configured to be threadably engaged directly or indirectly with an appropriate drive component such as, for example, a rotor of a mud motor or a drive shaft coupled with the rotor of the mud motor, as discussed below.

The drive end 112 may include four multi-angled faces 118, each situated longitudinally at a 90-degree interval about an outer circumference or periphery of the drive end 112. Each of the multi-angled faces may feature a crown 126 located at an apex of a first angled surface 128 and a second angled surface 130 where each of the first and the second angled surfaces 128, 130 angle away from the crown 126. Four convex radiused surfaces 120 may correspond to the four multi-angled faces 118, each traversing between a crest 122 of each one of the multi-angled faces 118 to a root 124 of the adjacent multi-angled face 118. As shown in FIG. 2C, the drive end 112 may also include a conical end cavity 132 that extends from a circular opening 134 within the drive end 112 to a concave, semi-spherical bearing surface 136 at its termination.

FIGS. 3A-3D illustrate respective perspective, side-plan, longitudinal cross-sectional, and end cross-sectional views of one embodiment of the female U-Joint member 104. In this embodiment, the female U-joint member 104 may include a male threaded end 138 and an opposing receptacle end 140. The male threaded end 138 may form a male threaded connection configured to engage directly or indirectly with an appropriate driven component, such as, for example, a radial bearing or an output shaft of a mud motor, as discussed further below.

The receptacle end 140 may include a female threaded connection 142 and a cavity 144 extending away from the female threaded connection 142. In this embodiment, the cavity 144 may include four flat surfaces 146 extending longitudinally from the cavity 144 at 90-degree intervals about an inner diameter 145 of the cavity 144. Four concave radiused surfaces 143 may arc between each of the flat surfaces 146 and may align with or oppose the radiused surfaces 120 of the male U-joint member 102 when the drive end 112 of the male U-joint member 102 is inserted coaxially into the receptacle end 140 of the female U-joint member 104. The cavity 144 may terminate in a circular receptacle 148 located at the bottom of the cavity 144. A threaded lubrication channel 147 may extend longitudinally from an end of the male threaded end 138 to the circular receptacle 148.

FIGS. 4A-4D illustrate perspective, top-plan, side-plan, and cross-sectional views of one embodiment of the central ball seat 106, respectively. In this embodiment, the central ball seat 106 may include a flat circular base 150 having a centrally located shaft 152 that extends proximally-to-distally therefrom. In an assembled configuration, a distal end 154 of the shaft 152 may terminate in a convex semi-spherical bearing surface 156 configured to impinge upon the concave semi-spherical bearing surface 136 of the conical end cavity 132 of the male U-joint member 102, discussed above. A grease passage 158 may be formed axially through the shaft 152 and the base 150 for lubrication purposes.

Figure 5A:
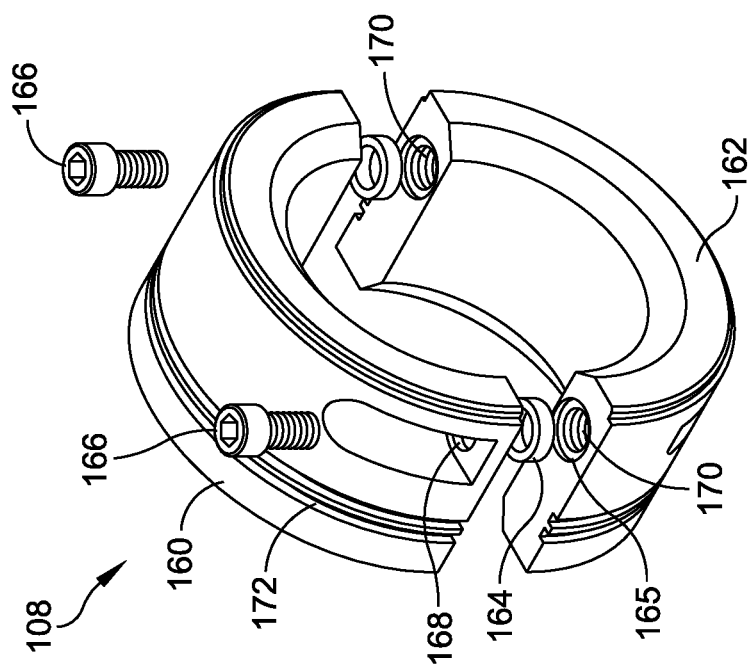
FIGS. 5A-5C illustrate respective perspective-exploded, side-exploded, and front-exploded views of one embodiment of a retaining device of the U-joint assembly of FIGS. 1A-1D.
Figure 4D:
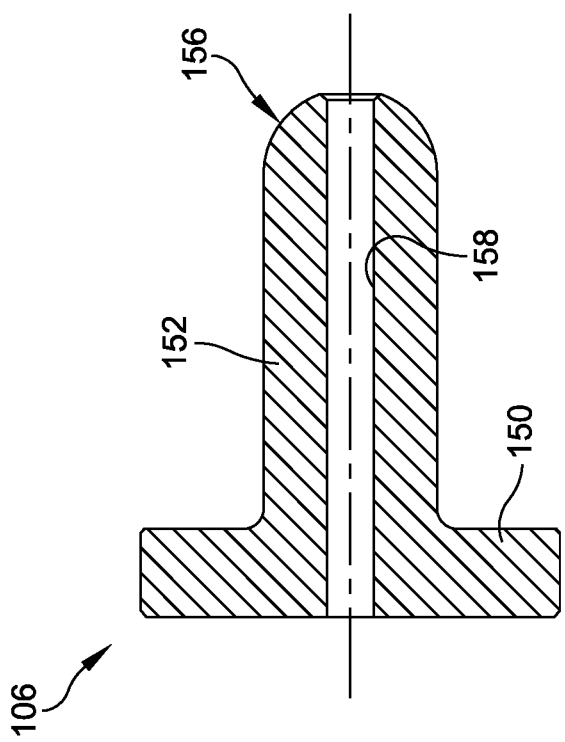
Figure 5B:
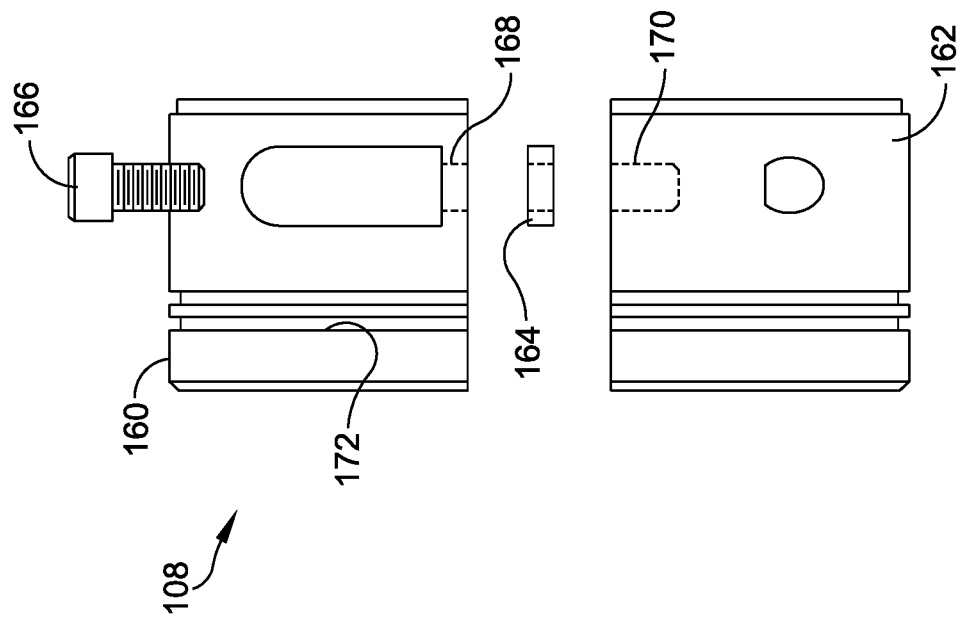
Figure 5C:
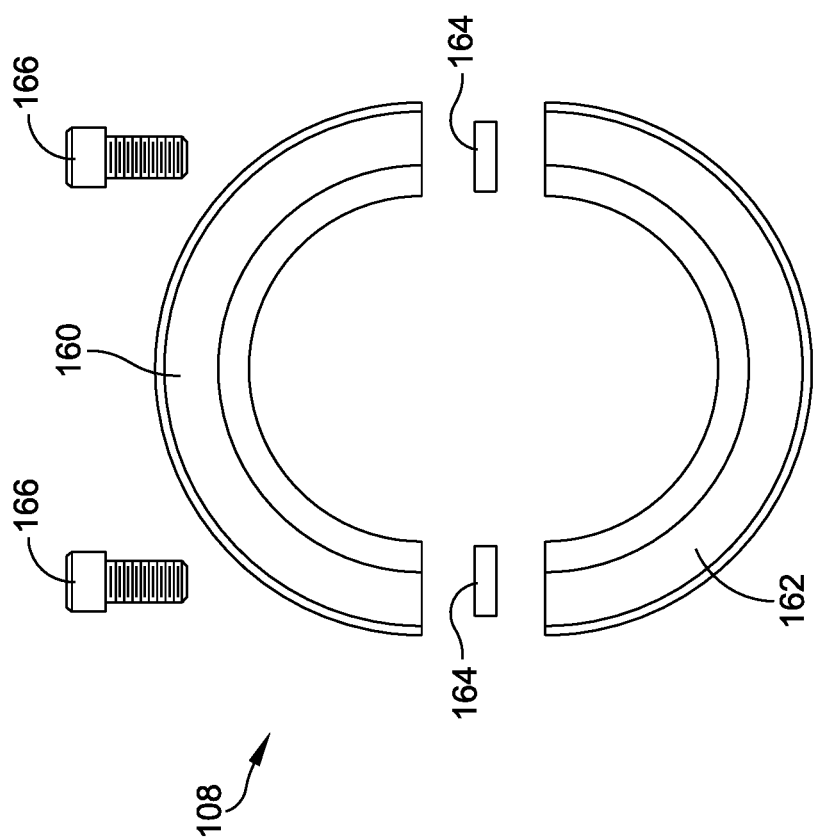

FIGS. 5A-5C illustrate respective perspective-exploded, side-exploded, and front-exploded views of one embodiment of the retaining device 108. In this embodiment, the retaining device 108 may include first and second semi-circular segments 160, 162 configured to clamp about the shaft 114 of the male U-joint member. Specifically, the first and the second semi-circular segments 160, 162 may be held in alignment about the shaft 114 by two alignment sleeves 164 disposed within corresponding counterbores 165 located 180 degrees apart from one another within the second semi-circular segment 162 and two appropriate fasteners 166 (e.g., socket head fasteners). The fasteners 166 may secure the first and the second semi-circular segments 160, 162 by extending through a pair of alignment apertures 168 formed within the first semi-circular segment 160, through the alignment sleeves 164 disposed within the counterbores 165, and into a corresponding pair of threaded apertures 170 formed in the second semi-circular segment 162, as shown in FIGS. 5A-5B. In one embodiment, the assembled retaining device 108, formed from the assembled first and second semi-circular segments 160, 162, may also include a circumferential threading 172 about its circumference. The circumferential threading 172 may be threadably coupled with the female threaded connection 142 of the female U-joint member 104.

Returning to FIGS. 1C-1D illustrating the assembled configuration of the U-joint assembly 100, the retaining device 108 may be secured about the smaller diameter shaft 114 of the male U-joint member 102 using the fasteners 166. In this regard, the retaining device 108 may be sized to provide an articulation offset, O, between the shaft 114 and the retaining device 108 when the retaining device 108 is secured about the shaft 114. This articulation offset, O, provides sufficient space for radial movement of the shaft 114 within the retaining device 108 when the drive end 112 of the male U-joint member articulates within the cavity 144 of the female U-joint member 104.

The circular flat base 150 of the central ball seat 106 may be received within the circular receptacle 148 located at the bottom of the receptacle cavity 144 of the female U-joint member 104. In turn, the drive end 112 of the male U-joint member 102 may be inserted into the receptacle cavity 144 of the receptacle end 140 of the female U-joint member 104, thereby causing the convex semi-spherical bearing surface 156 of the shaft 152 of the central ball seat 106 to be received by the concave semi-spherical bearing surface 136 of the conical end cavity 132 of the male U-joint member 102, such that the male and the female U-joint members 102, 104 may rotate and/or articulate about the longitudinal axis, L, with the bearing surfaces 136, 156 impinging upon each other. The circumferential threading 172 of the retaining device 108 may be threaded into the female threaded connection 142 of the female U-joint member 104 to secure the female U-joint member 104 about the central ball seat 106 and the drive end 112 of the male U-joint member 102.

In one embodiment, a single U-joint assembly 100, as shown and discussed in relations to FIGS. 1-5 above, may be used in connection with a flex shaft 180, shown in FIGS. 6A-6B. Embodiments of the flex shaft 180 may feature opposing first and second ends 182, 184 separated by a flexible shaft 185 disposed therebetween. The first end 182 of the flex shaft 180 may form a female threaded connection 186, and the second end 184 of the flex shaft 180 may form a male threaded connection 188.

Figure 7C:
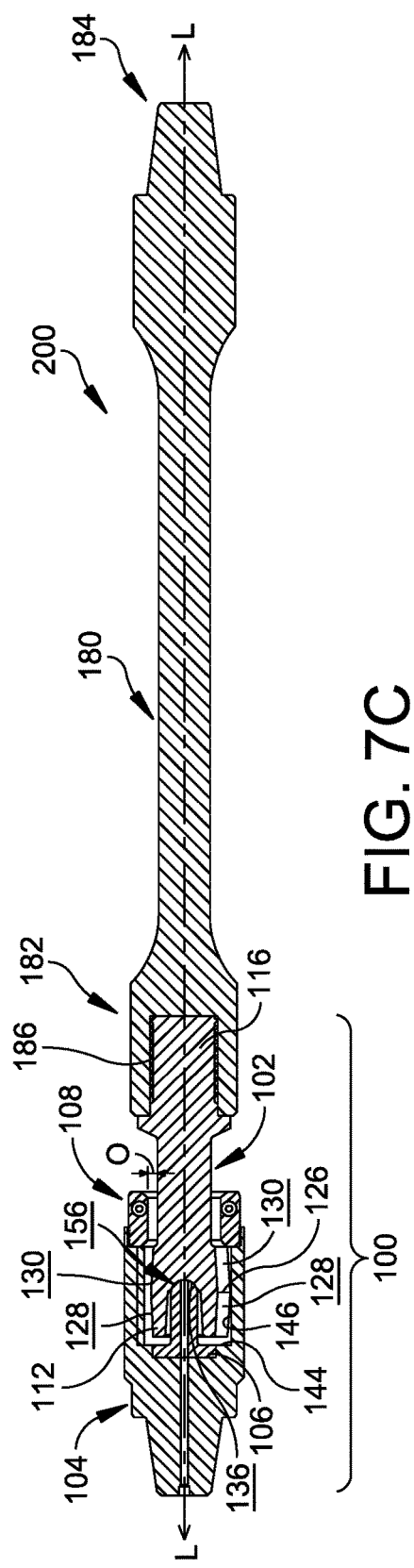

FIGS. 7A-7C illustrate respective perspective-exploded, side-plan, and cross-sectional views of a drive assembly 200 including a single U-joint assembly 100 assembled to and used in concert with an embodiment of the flex shaft 180. As assembled, the male threaded connection 116 of the male-threaded end 110 of the male U-joint 102 may be threaded into the female threaded connection 186 of the flex shaft 180. The U-joint assembly 100, and particularly the assembled drive assembly 200, transmits torque between the male U-joint member 102 and the female U-joint member 104 through an interfacing of the angled and radiused surfaces spaced about the periphery of the drive end 112 of the male U-joint member 102 and about the inner diameter 145 of the cavity 144 of the receptacle end 140 of the female U-joint member 104.

Specifically, and as shown in FIG. 7C, as the drive end 112 of the male U-joint member 102 articulates within the cavity 144 of the female U-joint member 104 relative to (e.g., in a direction orthogonal to) the longitudinal axis, L, the first angled surface 128 of the drive end 112 positioned parallel to an articulation angle of the flex shaft 180 engages the corresponding opposing flat surface 146 (FIG. 3A) situated longitudinally about the inner diameter 145 (FIG. 3D) of the cavity 144 of the female U-shaped member 102. At the same time, the second angled surface 130 on the opposing side of the drive end 112, also positioned in parallel with the articulation angle of the flex shaft 180, simultaneously engages the corresponding opposing flat surface 146 situated longitudinally about the inner diameter 145 of the cavity 144 of the female U-shaped member 102. The crowns 126 positioned orthogonal to the engaged multi-angled surfaces 118—or the crowns 126 between the first and the second angled surfaces 128, 130 of the multi-angled surfaces 118 offset 90 degrees from the engaged first and second angled surfaces 128, 130—may engage the corresponding opposing flat surfaces 146.

As the angle of the flex shaft 180 increases, an area of contact between the respective angled surfaces 128, 130 of the male U-joint member 102 and the flat surfaces 146 of the female U-joint member 104 correspondingly increases, thereby transmitting torque from the male U-joint member 102 to the female U-joint member 104. The angled surfaces 128, 130 of the male U-joint member 102 and the flat surfaces 146 of the female U-joint member 104 may be configured such that the U-joint assembly 100 distributes the applied or driving torsional force over a combined surface area of at least fourteen square inches, which spreads the force over a substantial flat surface and dramatically reduces wear on the joint and increases a life of the joint before failure.

The radiused surfaces 120 corresponding to each of the four multi-angled surfaces 118 of the drive end 112 of the male U-joint member 102 (FIGS. 2A-2B), each traversing between the crest 122 of each one of the multi-angled faces 118 to the root 124 of the adjacent multi-angled face 118, provide substantial resistance to shearing from high-torque power sections. Moreover, the central ball seat 106 facilitates smooth articulation with minimal wear, while the convex semi-spherical bearing surface 156 of the ball seat 106, which is seated within the concave semi-spherical bearing surface 136 of the male U-joint member 102, acts as a thrust bearing between the male and the female U-joint members 102, 104 to support significant axial loading.

In this embodiment of the drive assembly 200 incorporating the flex shaft 180, and due to the articulating nature of the U-joint assembly 100 and the flexible nature of the flex shaft 180, a single U-joint assembly 100 accomplishes what has previously required two U-joint assemblies in existing designs, thereby saving money in both inventory, assembly time, and repair time required.

Figure 8:
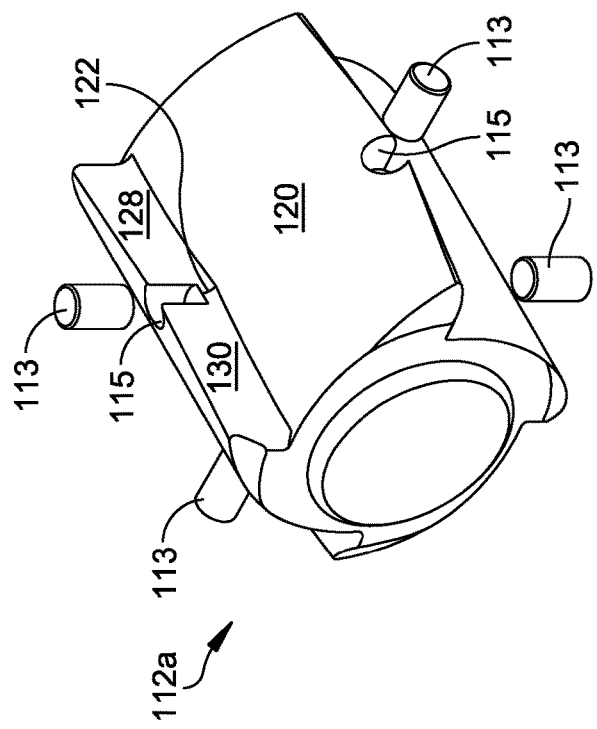
FIG. 8 illustrates a perspective view of an alternative embodiment of a drive end of the male U-joint member of FIGS. 2A-2C.

FIG. 8 provides a perspective view of an alternative embodiment of a drive end 112a of the male U-joint member 102. In this embodiment, the drive end 112a includes features identical to the drive end 112 of FIGS. 2A-2C, but contains a provision for the installation of a hardened roller or cylindrical bearing 113 within a cylindrical pocket 115 located on the crown 122 between each of the first and the second angled surfaces 128, 130. The addition of the cylindrical bearing 113 serves to reduce frictional wear between the crowns 122 and the flat surfaces 146 of the female U-joint member 104 during operation.

Figure 9:
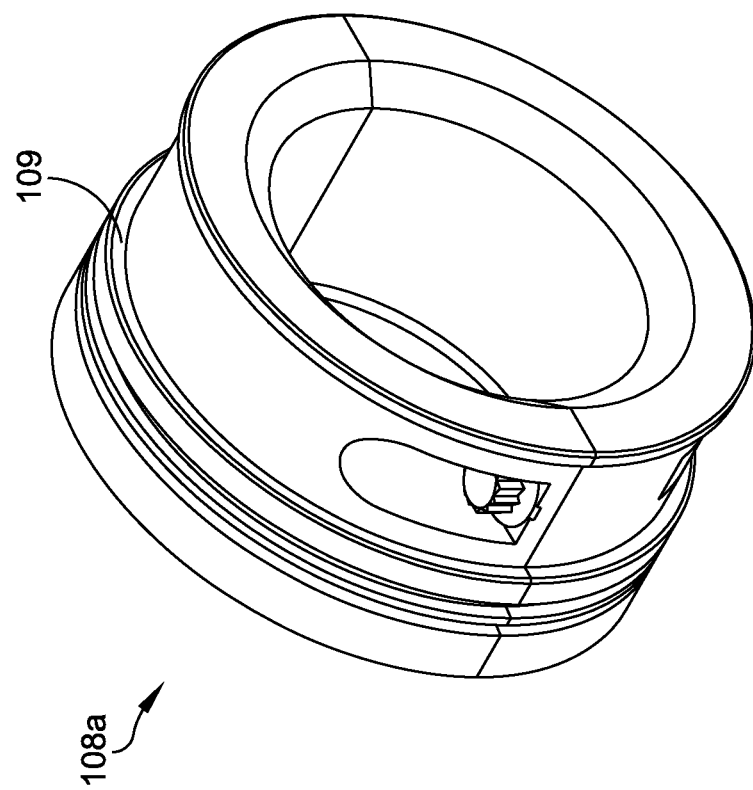
FIG. 9 illustrates a perspective view of an alternative embodiment of the retaining device of FIGS. 5A-5C.

FIG. 9 provides a perspective view of an alternative embodiment of a retaining device 108a used in assembling the U-joint assembly 100. In this embodiment, the retaining device 108a includes features identical to the retaining device 108 detailed in FIGS. 5A-5C, but includes a retaining shoulder 109, which provides a leverage surface for the installation of a sealing boot or other gasket (not shown).

Figure 10C:
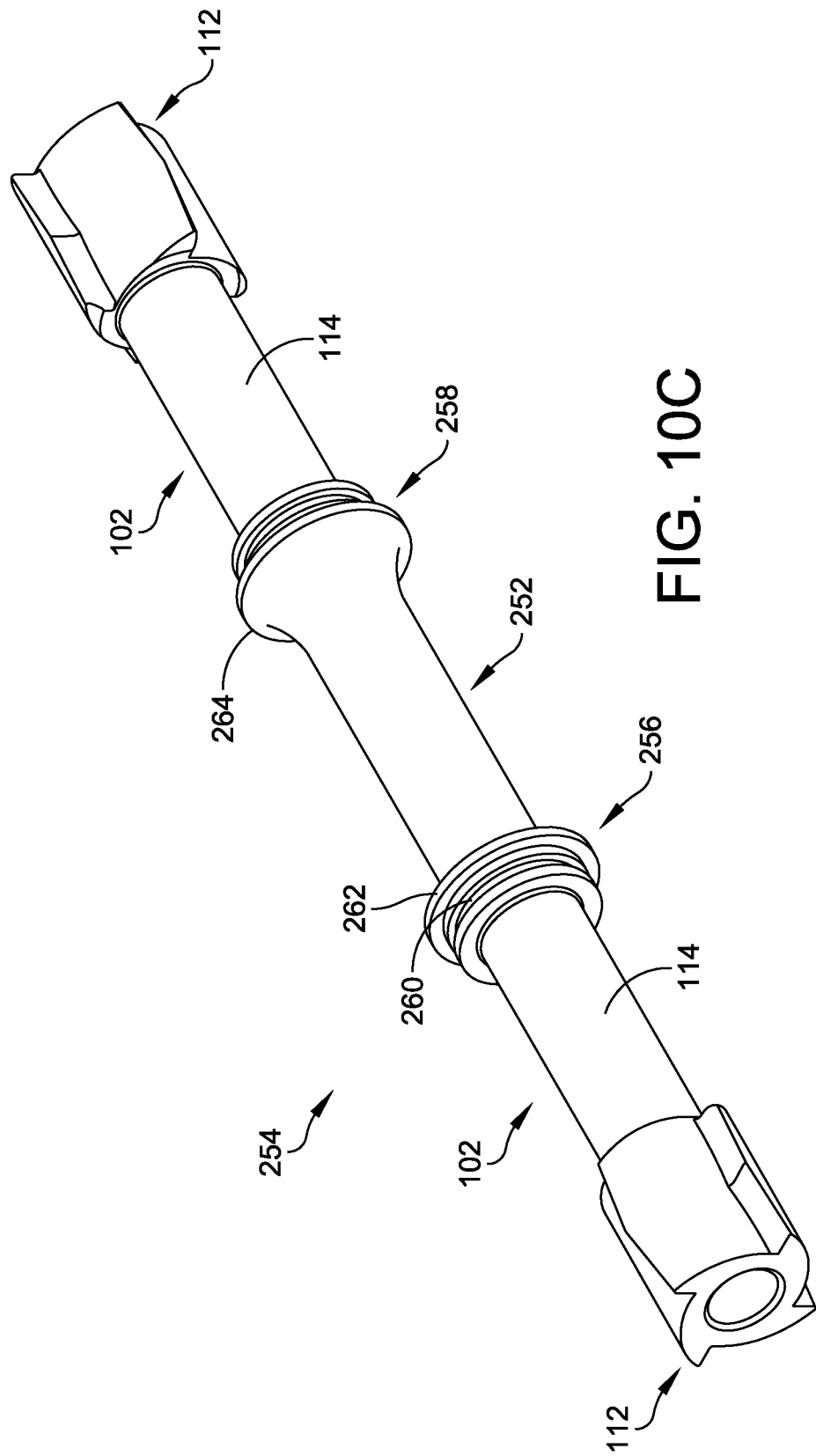
FIG. 10C illustrates a perspective view of one embodiment of a drive sub-assembly including the drive assembly of FIGS. 10A-10B with the female U-joint members, central ball seats, and retaining devices of the U-joint assemblies removed to reveal the male U-joint members and the common cylindrical shaft of FIGS. 10A-10B.

FIGS. 10A-10B illustrate side and cross-sectional views of one embodiment of an alternative drive assembly 250. In this embodiment, the drive assembly 250 may include two U-joint assemblies 100 connected by a common cylindrical shaft 252 having integral provisions for a sealing boot installation. Specifically, and as shown in FIG. 10C showing a drive sub-assembly 254 comprising two of the male U-joint members 102 coupled by the common cylindrical shaft 252 extending therebetween, the shaft 252 may having opposing first and second ends 256, 258. Each of the first and the second ends 256, 258 may include an O-ring groove 260, a retaining shoulder 262, and a radiused surface 264 configured to reduce the force of the drilling fluid bearing on the drive shaft boot.

FIGS. 11A-11B illustrate side and cross-sectional views of one embodiment of an alternative drive assembly 300. In this embodiment, the drive assembly 300 may include a flex shaft 180a similar to the flex shaft 180 of FIGS. 6A-6B. Flex shaft 108a may be identical to the flex shaft 180, except rather than a female connection, the first end 182 of the flex shaft 180a may form the drive end 112 of the male U-joint member 102. As assembled, the female U-joint member 104, the central ball seat 106, and the retaining device 108 may be assembled to the drive end 112 of the flex shaft 180b in the manner discussed above in relation to FIGS. 1C-1D.

Figure 12:
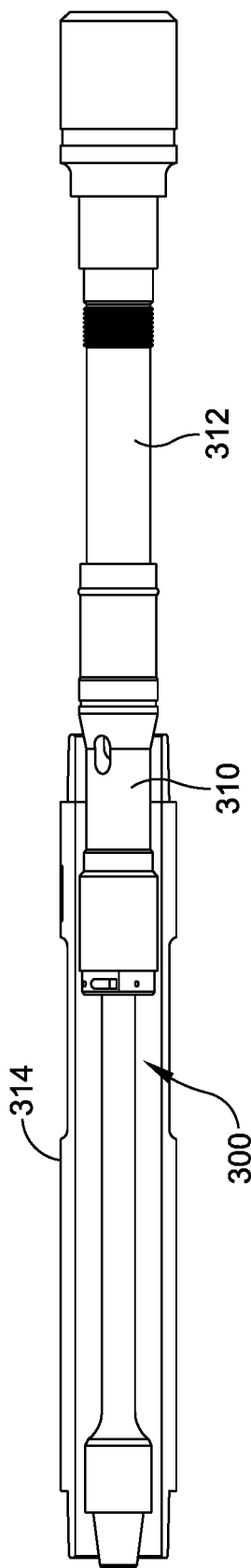
FIG. 12 illustrates a side-plan view of one embodiment of the drive assembly of FIGS. 11A-11B, as assembled to an upper male radial bearing, which is, in turn, assembled to an output shaft of a mud motor and placed within a sectional view of a fixed bend housing.

FIG. 12 illustrates a side view of the drive assembly 300 of FIGS. 11A-11B, as assembled to an upper male radial bearing 310, which is, in turn, assembled to an output shaft 312 of a mud motor and placed within a sectional view of a fixed bend housing 314.

The components forming the U-joint assembly 100 and drive assemblies 200, 250, and 300 may be formed of any appropriate material such as, for example, 17-4 stainless steel, heat treated to a PH900 condition after machining, primarily for its corrosion resistance, abrasive resistance, and torsional strength. Some embodiments may be formed of 4145HT, 4330 V MOD, and/or 4130HT steels given their abilities to harden the drive surfaces of the male and the female U-joint members. Both the male and the female U-joint members 102, 104 are repairable via welding and the resurfacing of worn areas through either machining or hand grinding.

Embodiments of the male U-joint member 102, the flexible shaft 180, 180b, and the common cylindrical shaft 252 may be either machined from billet or closed die forged to near net, with machining used to complete the features such as the cavity 144 terminating in the concave semi-spherical bearing surface 136 and the angled surfaces 128, 130 of the male U-joint member 102. As new, higher torque power sections become available, the closed die forging process may become the preferred method of manufacture for these components.

Embodiments of the U-joint assembly 100 and the drive assemblies 200, 250, 300 may be implemented in any high torque application in which the driving and driven components require an angular connection. As discussed above, exemplary operational environments include transferring torque in a variety of drilling environments involving a down-hole mud motor such as transferring torque between an eccentrically rotating rotor and a concentrically rotating output shaft of a mud motor to drive a drill bit or in traversing a bend in a housing of a mud motor.

Embodiments the disclosed U-joint assembly and drive assemblies differ from existing solutions in that the assembled components may be operated in any drilling environment with minimal wear or damage to the components due to the elegant design requiring minimal interfacing components, the manufacturing materials, and the ability to operate within or in absence of a sealed, lubricated environment. Existing U-joints and/or drive shafts utilizing ball and groove arrangements feature minimal points of contact between the driving and driven components. This configuration concentrates the applied torque on a small area and causes the material to yield immediately, resulting in surface deformation and leading to rapid wear and failure. The unique configuration of the disclosed U-joint assembly distributes the applied torsional forces through a combined surface area of at least fourteen square inches square inches, which spreads the force over substantial flat surfaces that minimize component wear and drastically increase component life.

FIG. 13 provides a flowchart depicting an exemplary method (350) of using embodiments of the U-joint assembly 100 and drive assemblies 200, 250, 300 to transmit torque across an articulating or angled joint. In this embodiment, the method (350) may begin with operably coupling the U-joint 100 between a drive component such as a mud motor rotor and a driven component such as a mud motor output shaft (352). In one embodiment, the male U-joint member 102 may be coupled with or incorporated into the flexible rod 180, 180b. In this regard, the female U-joint member 104 may be operably coupled with the driven component, or the mud motor output shaft 312, as shown in FIG. 12, and the male U-joint member 102 may be operably coupled with the drive component, or the mud motor rotor, via the flexible shaft 180, 180b.

The U-joint assembly 100 may be positioned at an angled or articulating joint such as, for example, a bend in the mud motor housing 314 (354), and the male U-joint member may be articulated relative to or in a direction orthogonal to the longitudinal axis, L, defined by the female U-joint member 104 until the male U-joint member 102 is disposed at an articulation angle relative to the longitudinal axis, L (356). The drive component may then be actuated such that a torque is transmitted across the angled U-joint assembly, or from the male U-joint member 102 coupled with the drive component to the female U-joint member 104 coupled with the driven component (358). The transmission of torque occurs through a contact between select ones of the first and the second angled surfaces 128, 130, which combine to form the multi-angled surfaces 118, that are positioned parallel to the articulation angle of the male U-joint member relative to the longitudinal axis, L, and opposing ones of the flat surfaces 146 of the cavity 144 of the female U-joint member 102.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A universal joint (U-joint) assembly for transmitting torque from a drive component to a driven component across an articulating joint, comprising:
   a female U-joint member coupled with the driven component, the female U-joint member defining a longitudinal axis and including a receptacle end, the receptacle end comprising:
      a cavity extending into the receptacle end and terminating in a circular receptacle; and
      four flat surfaces extending longitudinally from the cavity at 90-degree intervals about an inner diameter of the cavity; and
   a male U-joint member coupled with the drive component and having a drive end, the drive end comprising four multi-angled surfaces extending longitudinally from the drive end at 90-degree intervals about a periphery of the drive end, wherein when the drive end of the male U-joint member is received coaxially within the cavity of the female U-joint member, each of the multi-angled surfaces of the drive end of the male U-joint member opposes a corresponding one of the four flat surfaces of the female U-joint member:
   wherein the drive end of the male U-joint member further comprises a conical end cavity extending from a circular opening within the drive end to a concave semi-spherical bearing surface.

2. The U-joint assembly of claim 1, further comprising a central ball seat including:
   a circular base received within the circular receptacle of the female U-joint member; and
   a central shaft positioned coaxial to the longitudinal axis, the central shaft extending proximally-to-distally from the circular base to a convex semi-spherical bearing surface configured to impinge upon the concave semi-spherical bearing surface of the conical end cavity of the male U-joint member.

3. The U-joint assembly of claim 2, wherein the central ball seat further comprises a central grease passage extending along the longitudinal axis through the circular base and the central shaft.

4. The U-joint assembly of claim 2, further comprising a retaining device configured to secure the cavity of the female U-joint member about the drive end of the male U-joint member.

5. A universal joint (U-joint) assembly for transmitting torque from a drive component to a driven component across an articulating joint, comprising:
   a female U-joint member coupled with the driven component, the female U-joint member defining a longitudinal axis and including a receptacle end, the receptacle end comprising:
      a cavity extending into the receptacle end and terminating in a circular receptacle; and
      four flat surfaces extending longitudinally from the cavity at 90-degree intervals about an inner diameter of the cavity; and
   a male U-joint member coupled with the drive component and having a drive end, the drive end comprising four multi-angled surfaces extending longitudinally from the drive end at 90-degree intervals about a periphery of the drive end, wherein when the drive end of the male U-joint member is received coaxially within the cavity of the female U-joint member, each of the multi-angled surfaces of the drive end of the male U-joint member opposes a corresponding one of the four flat surfaces of the female U-joint member;

wherein the male U-joint member further comprises a male threaded end opposing the drive end, the male threaded end configured to couple with a flexible drive shaft.

6. A universal joint (U-joint) assembly for transmitting torque from a drive component to a driven component across an articulating joint, comprising:

a female U-joint member coupled with the driven component, the female U-joint member defining a longitudinal axis and including a receptacle end, the receptacle end comprising:
  a cavity extending into the receptacle end and terminating in a circular receptacle; and
  four flat surfaces extending longitudinally from the cavity at 90-degree intervals about an inner diameter of the cavity; and
a male U-joint member coupled with the drive component and having a drive end, the drive end comprising four multi-angled surfaces extending longitudinally from the drive end at 90-degree intervals about a periphery of the drive end, wherein when the drive end of the male U-joint member is received coaxially within the cavity of the female U-joint member, each of the multi-angled surfaces of the drive end of the male U-joint member opposes a corresponding one of the four flat surfaces of the female U-joint member;
wherein the male U-joint member comprises a flexible drive shaft incorporating the drive end, the drive end separated from an opposing male threaded end by a flexible shaft disposed therebetween.

7. A method of transmitting a torque from a drive component to a driven component across an articulating joint, comprising:

coupling a universal joint (U-joint) assembly between the drive component and the driven component, the U-joint assembly comprising:
  a female U-joint member coupled with the driven component, the female U-joint member defining a longitudinal axis and including a receptacle end, the receptacle end comprising a cavity extending into the receptacle end, the cavity terminating in a circular receptacle and including four flat surfaces extending longitudinally from the cavity at 90-degree intervals about an inner diameter of the cavity; and
  a male U-joint member coupled with the drive component and having a drive end comprising four multi-angled surfaces extending longitudinally from the drive end at 90-degree intervals about a periphery of the drive end, the drive end received coaxially within the cavity of the female U-joint member such that each of the multi-angled surfaces of the drive end of the male U-joint member opposes a corresponding one of the four flat surfaces of the cavity of the female U-joint member;
articulating the male U-joint member relative to the longitudinal axis such that the male U-joint member is disposed at an articulation angle relative to the longitudinal axis; and
actuating the drive component such that the torque is transmitted from the male U-joint member to the female U-joint member through a contact area between select ones of the four multi-angled surfaces that are positioned parallel to the articulation angle of the male U-joint member and opposing ones of the flat surfaces of the female U-joint member;
wherein:
the male U-joint member further comprises a conical end cavity that terminates in a concave semi-spherical bearing surface; and
the U-joint assembly further comprises the central ball seat including a base received within the circular receptacle of the female U-joint member and a shaft extending along the longitudinal axis from the base to a convex semi-spherical bearing surface, wherein when the torque is transmitted from the male U-joint member to the female U-joint member, the convex semi-spherical bearing surface of the central ball seat impinges upon the concave semi-spherical bearing surface of the conical end cavity of the male U-joint member.

8. The method of claim 7, wherein the U-joint assembly further comprises a retaining device including first and second semicircular segments configured to simultaneously threadably receive the female U-joint member and clamp about the male U-joint member to secure the female U-joint member about the central ball seat and the male U-joint member.

9. The method of claim 7, further comprising coupling a flexible shaft between the drive end and the drive component.

* * * * *